W. Van Anden.
Copying Press.
No. 1100. Reissued Dec. 18. 1860
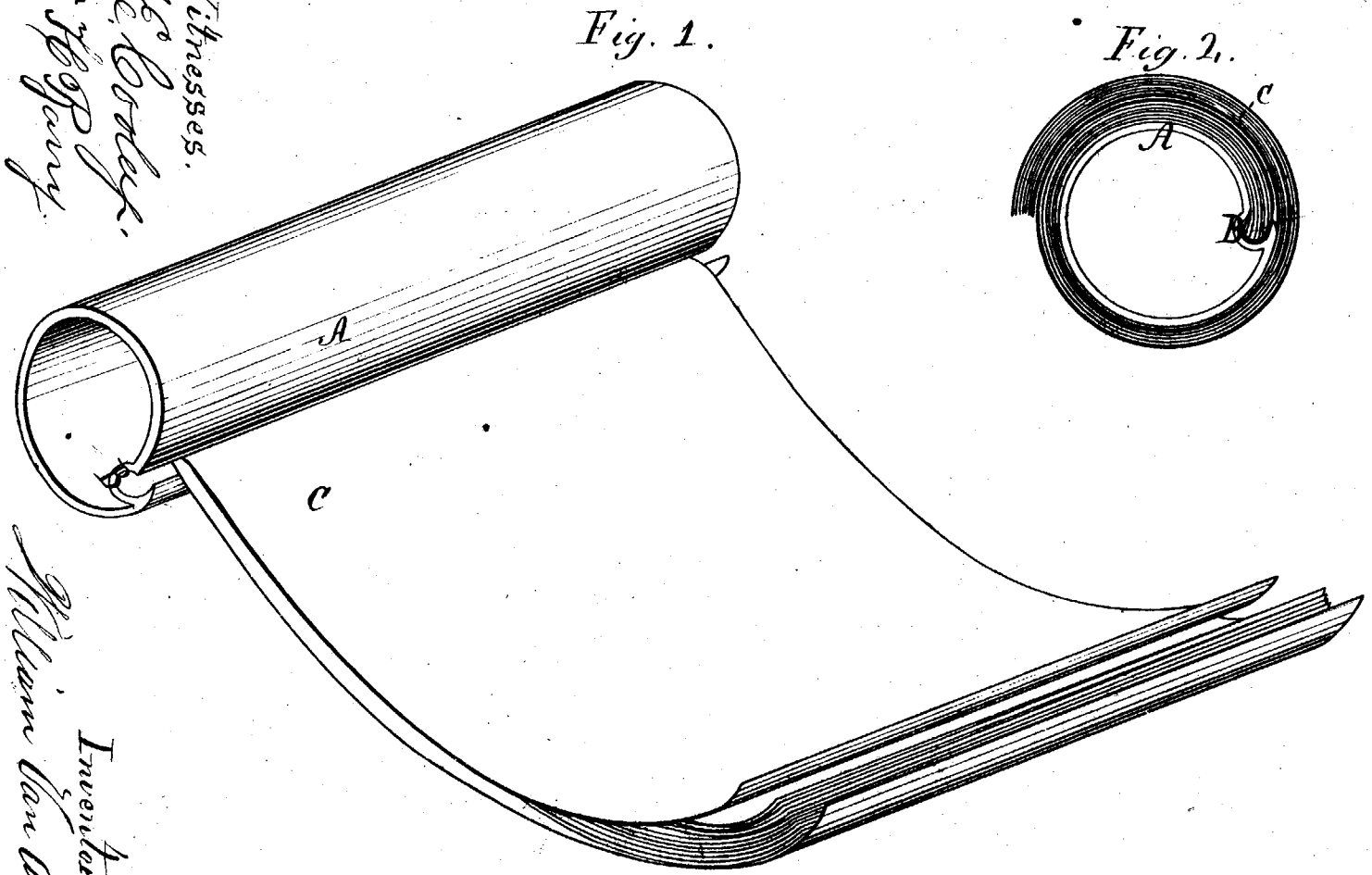
Witnesses.
S. E. Cooley.
Wm. H. Parry.
Inventor.
William Van Anden

UNITED STATES PATENT OFFICE.

WILLIAM VAN ANDEN, OF POUGHKEEPSIE, NEW YORK.

IMPROVEMENT IN PORTABLE COPYING APPARATUS.

Specification forming part of Letters Patent No. 21,456, dated September 7, 1858; Reissue No. 1,100, dated December 18, 1860.

*To all whom it may concern.*

Be it known that I, WILLIAM VAN ANDEN, of Poughkeepsie, county of Dutchess, State of New York, have invented a certain new and useful Improvement in the Manufacture of Portable Copying Books or Presses; and I do hereby declare the following to be a full description of the same.

The nature of my invention, or the improvement in the manufacture of portable copying books or presses, consists in uniting a spiral or scroll shaped cylindrical removable back or holder with a copying-book by means of a concave channel or groove formed longitudinally at the commencement and termination of the scroll, so that the book can be slid into and out of the groove at a moment's notice, and at the same time, when adjusted in the groove, firmly held in the place during the operation of rolling on the cylinder to take a copy in the book.

But to describe my invention or improvement more particularly, I will refer to the accompanying drawings, forming a part of this specification, the same letters of reference wherever they occur referring to like parts.

Figure 1 is a perspective view of the copying-book and removable back or holder. Fig. 2 is a transverse section of the same, showing the book rolled up on the back or holder.

Letter A is the scroll-shaped cylindrical removable back or holder, which may be made of wood, metal, or other suitable material, longitudinally of it. At and between the commencement and ending of the scroll is formed a concave channel or groove, B. This channel or groove is made tubular and having the longitudinal aperture smaller than the diameter of the tube. The object of this is to form a recess, so that when the back of the book C is slid into the tubular groove from either end of the cylindrical back the thickness of the book will be compressed between the converging edges of the groove and firmly hold the two together without the intervention of additional parts to combine them.

When the book has been filled with copies, or it is desirable to substitute a new book, all that has to be done is to slip the back of the book out of the groove and the change is made, thus affording great convenience in its use, and which could not be done if the book was attached to the cylindrical back by any wedging or clamping devices.

To take a copy of a letter or other writing, the letter is placed under a leaf of the book when unfurled, as in Figure 1, with the writing uppermost. The leaf of the book is made wet with a soft brush or by spreading over it a wet cloth. It is then rolled up, as shown in Fig. 2, and a copy is produced.

The scroll-shaped back or holder performs the twofold functions of a roller to make the copy and acts also as a holder.

Having now described my improvement in the manufacture of portable copying-presses, I will proceed to set forth what I claim and desire to secure by Letters Patent of the United States.

What I claim is—

A scroll-shaped back or holder, constructed and operated as described, in combination with a book, substantially as described.

WILLIAM VAN ANDEN. [L. S.]

Witnesses:

J. E. COOLEY,
WM. H. BARRY,
ROBT. N. PALMER.